(No Model.)

E. A. LILLY.
EXPANSION DRILL OR REAMER.

No. 387,169.  Patented July 31, 1888.

Witnesses:
Frank Robt.
Jas. H. Richards.

Edward A. Lilly
Inventor.
Wm. A. Pike,
Attorney.

UNITED STATES PATENT OFFICE.

EDWARD A. LILLY, OF PHILADELPHIA, PENNSYLVANIA.

EXPANSION DRILL OR REAMER.

SPECIFICATION forming part of Letters Patent No. 387,169, dated July 31, 1888.

Application filed December 28, 1887. Serial No. 259,267. (No model.)

*To all whom it may concern:*

Be it known that I, EDWARD A. LILLY, a citizen of the United States, residing at Philadelphia, in the State of Pennsylvania, have invented certain new and useful Improvements in Expansion-Drills, of which the following is a specification.

My invention relates to expansion-drills, and the object of my improvement is to keep the drill up to a standard gage by expanding its lips to equalize the loss due to grinding, sharpening, and the friction of use; also, to vary its diameter when a variation in the diameter of a hole to be drilled is desired. I attain these objects by means of the mechanism illustrated in the accompanying drawings, in which—

Figure 1:
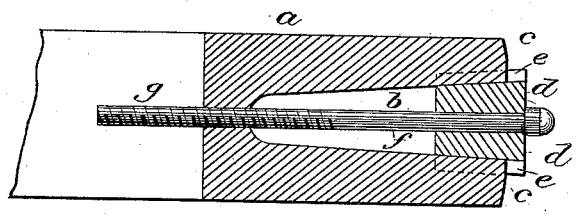
Figure 2:
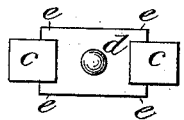

Figure 1 is a longitudinal vertical section of a portion of the drill, showing the wedge between the lips of the drill and its operating-screw. Fig. 2 is an end view of the wedge and screw in position, showing the flanges of the wedge.

The drill $a$ is constructed with a wedge-shaped opening, $b$, located centrally between its lips or cutting-edges $c\ c$, in which is inserted a wedge, $d$, provided with flanges $e\ e\ e\ e$, as shown in Fig. 2. Motion is imparted to wedge $d$ by screw $f$, working in the tapped recess $g$ and passing longitudinally and centrally through the wedge $d$. Screw $f$ also secures the wedge $d$ in any desired position after adjustment. In finishing the drill $a$ the wedge $d$ is placed in the wedge-shaped opening $b$ and forced longitudinally by means of screw $f$, spreading the lips $c\ c$ of the drill $a$ sufficiently to insure a decrease of its diameter by the spring of the steel upon the withdrawal of the wedge $d$. Then the drill is made the desired diameter.

When it is necessary to vary the diameter to equalize the loss due to grinding, sharpening, and the friction of use, or for other purposes, the wedge $d$ is moved by revolving the screw $f$ either to force the wedge $d$ farther into the wedge-shaped opening $b$ to increase the diameter of the drill, or to allow the wedge $d$ to move out of the wedge-shaped opening $b$ to decrease the diameter of the drill $a$, as may be desired.

When the drill $a$ is subjected to the twisting strain due to drilling, the flanges $e\ e\ e\ e$ serve to support the lips or cutting-edges $c\ c$, preserving the rigidity of the drill necessary for the drilling of a smooth and perfect hole.

I do not claim, broadly, the combination of a tapering plug inserted into a tapering opening, as I am aware the same is not new.

The salient features of my invention are simplicity of construction combined with strength, rigidity, durability, nicety of adjustment, and the fact that when once gaged to the desired diameter the wedge is securely held in position and is immovable from jar and friction.

What I claim specifically as my improvement is—

The expanding-drill $a$, with wedge-shaped opening $b$, in combination with wedge $d$, provided with flanges $e\ e\ e\ e$, and the operating-screw $f$, substantially as shown and described.

In testimony whereof I have signed my name to this specification in the presence of two subscribing witnesses.

EDWARD A. LILLY.

Witnesses:
 CHARLES H. SPRAGUE,
 FRANK ROBB.